W. BUDESHEIM & J. D. STINCHCOMB
SECTIONAL EMERGENCY TIRE.
APPLICATION FILED DEC. 30, 1909.
975,325.
Patented Nov. 8, 1910.
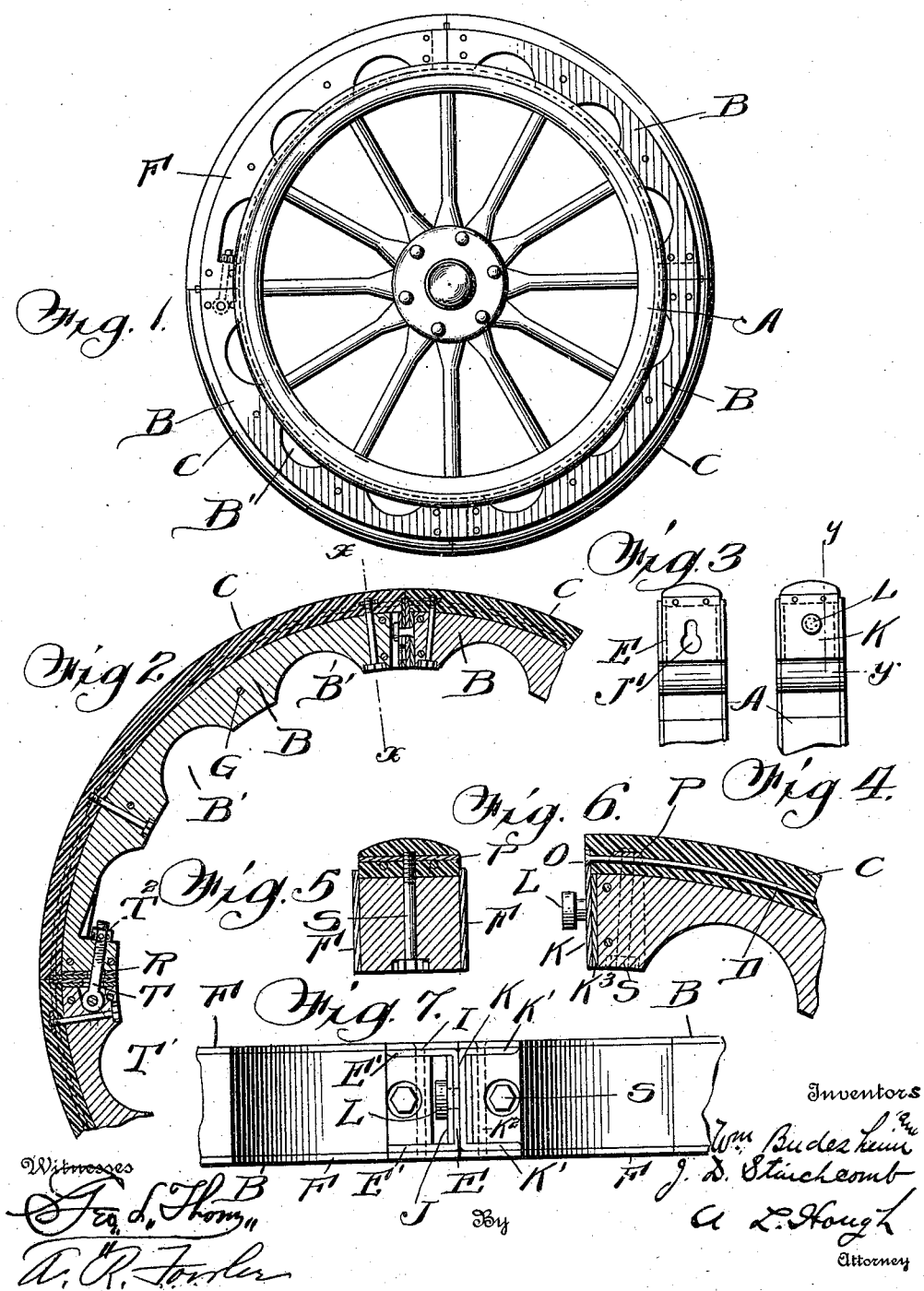

UNITED STATES PATENT OFFICE.

WILLIAM BUDESHEIM AND JEFFERSON D. STINCHCOMB, OF BALTIMORE, MARYLAND.

SECTIONAL EMERGENCY-TIRE.

975,325.  Specification of Letters Patent.  Patented Nov. 8, 1910.

Application filed December 30, 1909. Serial No. 535,644.

*To all whom it may concern:*

Be it known that we, WILLIAM BUDESHEIM and JEFFERSON D. STINCHCOMB, citizens of the United States, residing at Baltimore, State of Maryland, have invented certain new and useful Improvements in Sectional Emergency-Tires; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sectional emergency tires adapted for use for quick application to the rims of wheels in the event of the pneumatic tires being punctured or otherwise injured.

The invention comprises various details of construction and combinations and arrangements of parts which will be hereinafter fully described and then specifically defined in the appended claims.

We illustrate our invention in the accompanying drawings, in which:—

Figure 1 is a side elevation showing the application of the sectional tires to the rim of a wheel. Fig. 2 is a longitudinal sectional view through portions of sections of the tire. Fig. 3 is a detail end view of one of the sections showing the recessed plate. Fig. 4 is a detail view in end elevation of a section with a headed lug thereon for engagement with the slot of the plate shown in Fig. 3. Fig. 5 is a sectional view on line *x*—*x* of Fig. 2. Fig. 6 is an enlarged detail sectional view through one of the sections of the tire, and Fig. 7 is a view showing two of the sections connected together.

Reference now being had to the details of the drawings by letter, A designates the rim of a wheel and B, B, the sections of the emergency tire which, in the drawings, are shown as scalloped away as at B' in order to reduce the weight of the tire and still retain ample strength. Said tire sections have resilient tread surfaces C, preferably of rubber, and each of said tread surfaces is longitudinally apertured a slight distance from its inner face for the reception of the tie rods D which extend through said apertures. Fastened to corresponding ends of the sections B are the plates E, each of which has flanges E' extending into recesses formed in the opposite faces of the rim B, as shown clearly in Fig. 7 of the drawings. Curved segment plates F, made preferably of metal and having scallops which register with the scallops or recesses B', are positioned one upon either side of the rim and are secured thereto by means of bolts G passing through registering apertures in the plates and rims. Said plates F are held against the flanges E' by means of bolts I which are passed through apertures in said plates and flanges and also the rim. A second and reinforcing plate J is fastened to the plate E and the two plates have registering keyhole slots J', as shown clearly in Fig. 3 of the drawings, the meeting end of each section being provided with a similar plate K having flanges K', as shown in Fig. 7 of the drawings, and which plate is held by means of the bolts K² passing through registering apertures in the flanges K', rim and the plates F. Each of the plates K is provided with a headed lug L which is adapted to engage the slot J' in the manner shown in Figs. 2 and 7 of the drawings to securely hold the sections together. It will be noted that a reinforcing plate K³ is mounted intermediate the flanges K' and fastened to the rear face of the plate. Each of the plates E and K is provided with apertures O near their outer ends and of such size as to receive the ends of the wire D and which ends are riveted or upset to securely anchor the end of the wire, as shown in Fig. 6 of the drawings.

As a further reinforcement to hold the wires to the sections of the rim, we have shown plates P passing through the tread surface of the tire and in engagement with the outer portions of the wires D, and bolts S pass through registering apertures in the tire sections, tread surface and plates P, the bolts engaging threaded apertures in said plates in order to securely hold the same in place. Said bolts S and plates P may be positioned at various intervals or may be dispensed with if desired, the plates K and E being usually sufficient to securely hold the wires and the tread surfaces in which they are embedded to the tire sections.

After the several tire sections have been connected together in the manner shown and described, the meeting ends of two of the sections are drawn together by means of a bolt T, shown clearly in Fig. 2 of the drawings, which is mounted upon a transversely disposed bolt T' held by the tire section and the two plates F, said bolt T passing through registering apertures in the plates R which are fastened to the meeting ends of the two adjacent tire sections. In Fig. 2 of the drawings, it will be noted that one of the tire sections is recessed out for the reception of the eye at the end of the bolt T and the other end is apertured for the reception of the bolt upon which a threaded nut T² is mounted whereby, as the nut is tightened against the shoulder of the recess in the rim, the sections of the tire may be drawn closely together, thus causing the inner marginal edges of the tire sections to frictionally engage the rim of the wheel.

While we have shown our tire as made up of solid tire sections which are recessed out and which, in ordinary use, would be made of wood, it will be understood that we do not restrict our invention to sections made of any material as, obviously, the sections might be made of pressed or malleable steel, iron or other metal, and so formed that the end portions might be inwardly bent and apertured for the reception of the connections between the sections and for the reception of the ends of the wire which retain the tread surfaces, thus dispensing with the form of flanged plates illustrated.

What we claim to be new is:—

1. A sectional emergency tire, comprising tire sections, tread surfaces, wires extending longitudinally through the latter, apertured plates at the ends of the tires in which the ends of said wires are fastened, the plates at corresponding ends of said sections being slotted, a headed lug upon the other end of each section adapted to engage said slot to hold the sections together, and means for drawing together the ends of the sections thus connected to hold the same against the circumference of the rim of a wheel.

2. A sectional emergency tire, comprising tire sections, tread surfaces, wires extending longitudinally through the latter, plates passing within said tread surface and provided with threaded apertures and bearing against the outer edges of said wires, bolts passing through apertures in the tire sections and having their threaded ends engage the holes in said plates, interlocking means for holding the sections together, and means for drawing the free ends of the sections thus connected against the rim of a wheel.

3. A sectional emergency tire, comprising tire sections, tread surfaces, wires extending longitudinally through the latter, plates passing within said tread surface and provided with threaded apertures and bearing against the outer edges of said wires, bolts passing through apertures in the tire sections and having their threaded ends engage the holes in said plates, interlocking means for holding the sections together, an eye bolt pivotally connected to one of said sections and passing through an aperture formed in the end of an adjacent section, and a nut mounted upon the threaded end of said eye bolt and adapted to bear against the shoulder of a recessed portion of the plate through which the threaded bolt passes, forming means for drawing the sections against the rim of a wheel.

4. A sectional emergency tire made up of sections, segment plates fastened to the opposite faces of the sections, a flanged plate fastened to the end of each section and slotted, the flanges of said plate being countersunk in the opposite faces of the tire sections and clamped by said segment plates, bolts passing through registering apertures in the tire sections, segment and flanged plates, tread surfaces upon each section, wires passing through said tread surface and having their ends fastened in apertures in said flanged plates, a lug projecting from each end of the sections and adapted to engage slots formed in the plates and the ends of the adjacent section, an eye bolt seated in a recess in one end of one section, a bolt passing transversely through the tire section and engaging said eye, the end of the section adjacent to said eye bolt having an aperture therein for the reception of the shank portion of the eye bolt, and a nut mounted upon the threaded end of said eye bolt.

In testimony whereof we hereunto affix our signatures in presence of two witnesses.

WILLIAM BUDESHEIM.
JEFFERSON D. STINCHCOMB.

Witnesses:
WALTER H. BILLINGSLEA,
LORIAN J. GROPE.